(12) United States Patent
Wang et al.

(10) Patent No.: US 10,083,497 B2
(45) Date of Patent: Sep. 25, 2018

(54) DEMOSAICING METHODS AND APPARATUSES USING THE SAME

(71) Applicant: VIA Alliance Semiconductor Co., Ltd., Shanghai (CN)

(72) Inventors: Yuanyuan Wang, Beijing (CN); Aimin Liang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 136 days.

(21) Appl. No.: 14/972,556

(22) Filed: Dec. 17, 2015

(65) Prior Publication Data
US 2017/0053379 A1    Feb. 23, 2017

(30) Foreign Application Priority Data
Aug. 19, 2015    (CN) .......................... 2015 1 0512470

(51) Int. Cl.
 *G06K 9/32*   (2006.01)
 *G06T 3/40*   (2006.01)
(52) U.S. Cl.
 CPC ................... *G06T 3/4015* (2013.01)
(58) Field of Classification Search
 CPC .............. G06T 3/4015; G06T 7/408
 USPC ...................................................... 382/300
 See application file for complete search history.

(56) References Cited

U.S. PATENT DOCUMENTS

| 2006/0146150 A1* | 7/2006 | Kang ................ G06T 3/4015 348/272 |
| 2008/0075393 A1* | 3/2008 | Kwon ............... G06T 3/4015 382/300 |
| 2017/0039682 A1* | 2/2017 | Oh ................... G06T 3/4015 |

FOREIGN PATENT DOCUMENTS

| CN | 103347190 A | 10/2013 |
| CN | 104732561 A | 6/2015 |

OTHER PUBLICATIONS

Chinese language office action dated Nov. 16, 2017, issued in application No. CN 201510512470.0.

* cited by examiner

*Primary Examiner* — Andrew Moyer
(74) *Attorney, Agent, or Firm* — McClure, Qualey & Rodack, LLP

(57) ABSTRACT

A method for demosaicing, performed by a processing unit, at least containing: acquiring a frame with a Bayer pattern, wherein the Bayer pattern has alternating red (R), green (G) and blue (B) pixels; calculating a green (RG) value for each R pixel; calculating a green (BG) value for each B pixel; calculating a blue (RB) value for each R pixel; and calculating a red (BR) value for each B pixel. The step of calculating an RG or BG value for each R or B pixel at least contains: selecting one of a first interpolation algorithm and a second interpolation algorithm according to chrominance differences between the R or B pixel and surrounding pixels in a horizontal direction and a vertical direction; and using the selected interpolation algorithm to calculate the RG or BG value for the R or B pixel.

18 Claims, 4 Drawing Sheets

| R(1,1) | G(1,2) | R(1,3) | G(1,4) | R(1,5) | G(1,6) | R(1,7) | G(1,8) |
| --- | --- | --- | --- | --- | --- | --- | --- |
| G(2,1) | B(2,2) | G(2,3) | B(2,4) | G(2,5) | B(2,6) | G(2,7) | B(2,8) |
| R(3,1) | G(3,2) | R(3,3) | G(3,4) | R(3,5) | G(3,6) | R(3,7) | G(3,8) |
| G(4,1) | B(4,2) | G(4,3) | B(4,4) | G(4,5) | B(4,6) | G(4,7) | B(4,8) |
| R(5,1) | G(5,2) | R(5,3) | G(5,4) | R(5,5) | G(5,6) | R(5,7) | G(5,8) |
| G(6,1) | B(6,2) | G(6,3) | B(6,4) | G(6,5) | B(6,6) | G(6,7) | B(6,8) |
| R(7,1) | G(7,2) | R(7,3) | G(7,4) | R(7,5) | G(7,6) | R(7,7) | G(7,8) |
| G(8,1) | B(8,2) | G(8,3) | B(8,4) | G(8,5) | B(8,6) | G(8,7) | B(8,8) |

FIG. 4

DEMOSAICING METHODS AND APPARATUSES USING THE SAME

CROSS REFERENCE TO RELATED APPLICATIONS

This application claims the benefit of China Patent Application No. 201510512470.0, filed on Aug. 19, 2015, the entirety of which is incorporated by reference herein.

BACKGROUND

Technical Field

The present invention relates to image processing, and in particular, it relates to demosaicing methods and apparatuses using the same.

Description of the Related Art

A demosaicing algorithm is used by an ISP (Image Signal Processor) to reconstruct a full color image from incomplete color samples output from an image sensor overlaid with a CFA (Color Filter Array). A CFA is a mosaic of color filters. Commercially, the most commonly used CFA configuration is the Bayer filter. The Bayer filter has alternating R (red) and G (green) filters for odd rows and alternating G (Green) and B (blue) filters for even rows. There are twice as many green filters as red or blue ones, catering to the human eye's higher sensitivity to green light. However, conventional demosaicing algorithms are unable to properly reconstruct images to include the texture of slashes or edges. Thus, demosaicing methods and apparatuses using the same are introduced to address the aforementioned drawbacks.

BRIEF SUMMARY

A method for demosaicing, performed by a processing unit, at least contains: acquiring a frame with a Bayer pattern, wherein the Bayer pattern has alternating red (R), green (G) and blue (B) pixels; calculating a green (RG) value for each R pixel; calculating a green (BG) value for each B pixel; calculating a blue (RB) value for each R pixel; and calculating a red (BR) value for each B pixel. The step of calculating an RG or BG value for each R or B pixel at least contains: selecting a first interpolation algorithm or a second interpolation algorithm according to chrominance differences between the R or B pixel and surrounding pixels in a horizontal direction and a vertical direction; and using the selected interpolation algorithm to calculate the RG or BG value for the R or B pixel.

An embodiment of an apparatus for demosaicing is introduced. The apparatus at least contains: a camera module controller coupled to a camera module; and a processing unit coupled to the camera module controller. The processing unit acquires a frame with a Bayer pattern, which has alternating R, G and B pixels; selecting a first interpolation algorithm or a second interpolation algorithm according to chrominance differences between the R or B pixel and surrounding pixels in a horizontal direction and a vertical direction, and then, using the selected interpolation algorithm to calculate the RG or BG value for the R or B pixel; calculating a RB value for each R pixel; and calculating a BR value for each B pixel.

The methods and apparatuses for demosaicing introduced in the embodiments of the invention, when calculating an RG/BG value for each R/B pixel of the Bayer pattern, takes chrominance differences between the R/B pixel and the surrounding pixels in the horizontal and vertical directions into account and selects one interpolation algorithm according to an image characteristic (e.g. if an edge or a slashed texture is presented) indicated by the chrominance differences in these two directions, yielding better performance.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

FIG. 4 is a schematic diagram of an 8×8 Bayer pattern according to an embodiment of the invention.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
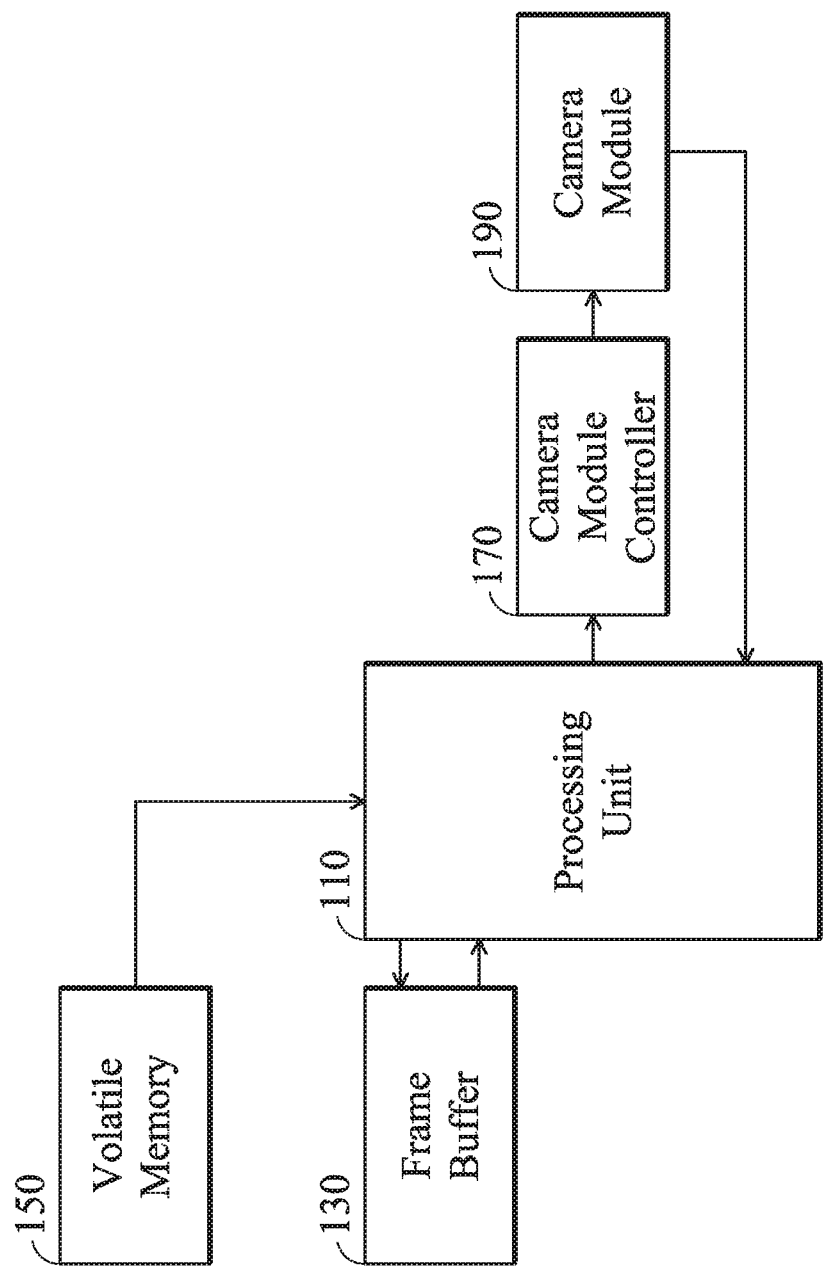
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may be integrated in an ISP (Image Signal Processor) to control, via a camera module controller 170, a camera module 190 for capturing multiple frames. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. However, a defective pixel of the image sensor cannot correctly detect light strength. Therefore, the processing unit 110 may use the demosaicing method to reconstruct a Bayer pattern to a full image and store the reconstruction results in the frame buffer 130. The volatile memory 140, such as a DRAM (Dynamic Random Access Memory), for storing necessary data in execution, such as runtime variables, data tables, etc. The Bayer pattern has alternating R (red), G (green) and B (blue) pixels. The demosaicing method, specifically, calculates a green (RG/BG) value for each R/B pixel, a blue (RB) value for each R pixel, a red (BR) value for each B pixel, and a red (GR) value and a blue (GB) value for each G pixel, resulting in a complete image of RGB channels.

Figure 2:
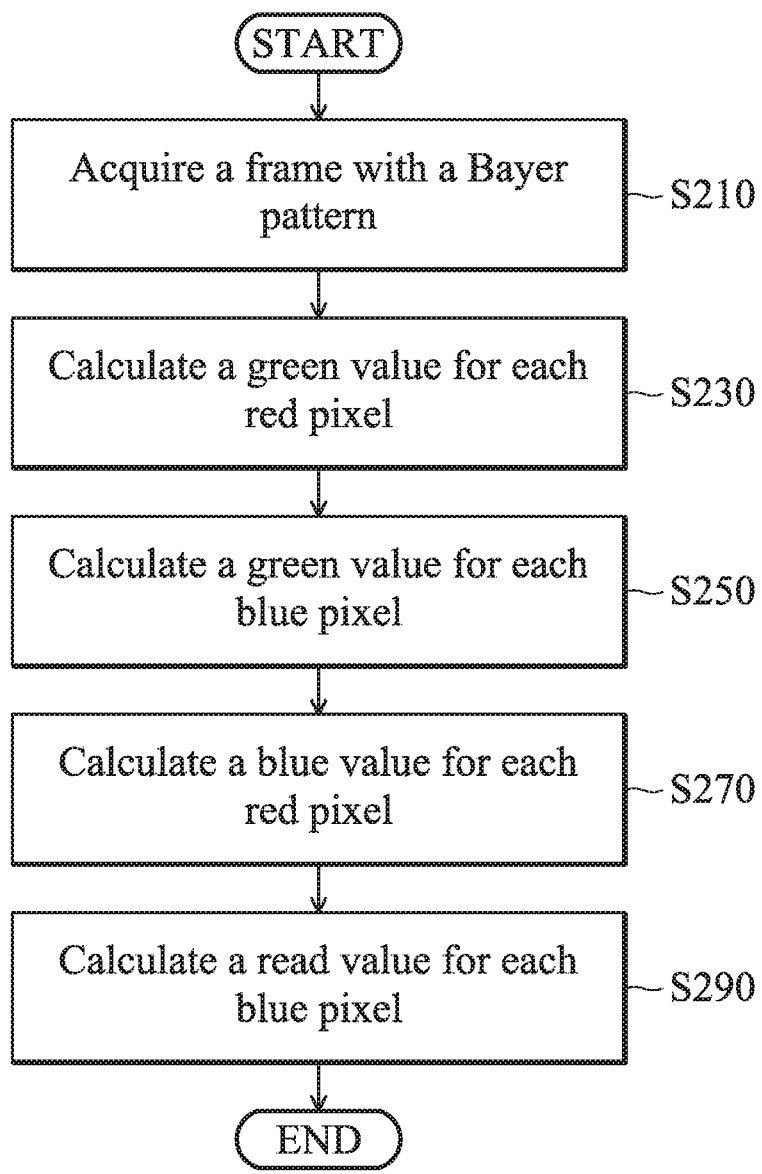
FIG. 2 is a flowchart illustrating a demosaicing method, which is performed by a processing unit, according to an embodiment of the invention.

FIG. 2 is a flowchart illustrating a demosaicing method, which is performed by a processing unit, according to an embodiment of the invention. The process begins with acquisition of a frame with the Bayer pattern, which has alternating R, G and B pixels (step S210). The processing unit 110 calculates a green (RG) value for each R pixel (step S230), a green (BG) value for each B pixel (step S250). Specifically, one of first interpolation algorithm and second interpolation algorithm is selected according to chrominance differences between an R/B pixel and the surrounding pixels in the horizontal and vertical directions and the selected interpolation algorithm is used to calculate the green (RG/BG) value for the R/B pixel. Next, the processing unit 110 calculates a blue (RB) value for each R pixel (step S270) and calculates a red (BR) value for each B pixel (step S290). The demosaicing method introduced in the embodiments of the invention, when calculating an RG/BG value for each R/B pixel of the Bayer pattern, takes chrominance differences between the R/B pixel and the surrounding pixels in the horizontal and vertical directions into account and selects one interpolation algorithm according to image characteristics (e.g. if an edge or a slashed texture is presented) indicated by the chrominance differences in these two directions, yielding better performance.

Figure 3:
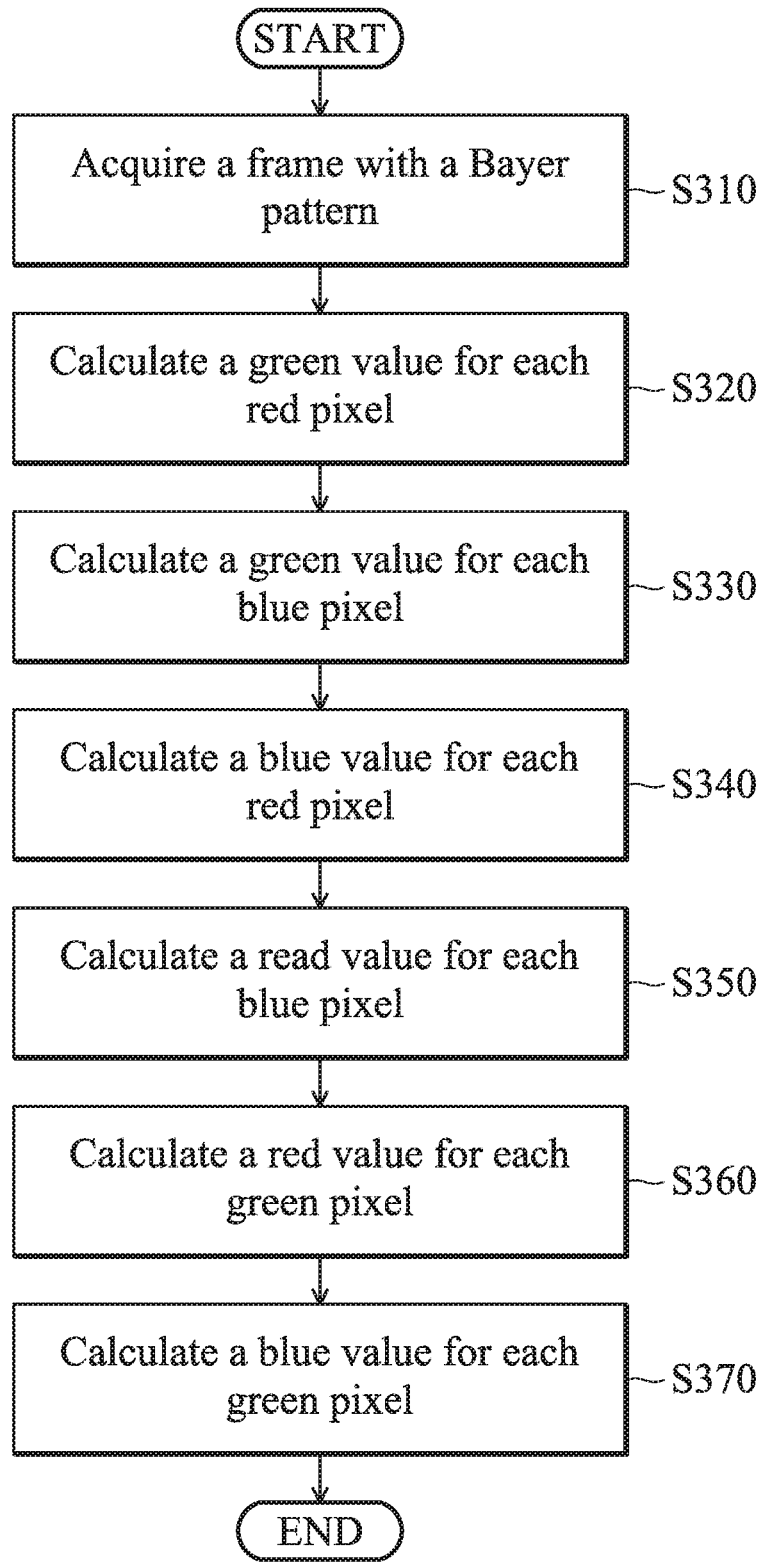
FIG. 3 is a flowchart illustrating a demosaicing method, which is performed by a processing unit, according to an embodiment of the invention.

FIG. 3 is a flowchart illustrating a demosaicing method, which is performed by a processing unit, according to an embodiment of the invention. The process begins with acquisition of a frame with the Bayer pattern, which has alternating R, G and B pixels (step S310). The processing unit 110 calculates a green (RG) value for each R pixel (step S320) and a green (BG) value for each B pixel (step S330), that is, the processing unit 110 reconstructs the whole G plane. Next, the processing unit 110 calculates a blue (RB) value for each R pixel (step S340) and a red (BR) value for each B pixel (step S350). Pseudo code for calculating the red values and the blue values will be described in the following paragraphs. It should be noted that step S350 may take place before step S340 or step S370 may take place before step S360, and the invention should not be limited thereto. In addition, steps 340 and 350 may be performed after steps S360 and S370 to employ different interpolation algorithms to reconstruct the G plane.

FIG. 4 is a schematic diagram of an 8×8 Bayer pattern according to an embodiment of the invention. A frame contains alternating R and G (also referred to as Gr) pixels for odd rows, for example, {R(1, 1), G(2, 1), R(3, 1), G(4, 1), R(5, 1), G(6, 1), R(7, 1), G(8, 1)}, and alternating G (also referred to as Gb) and B pixels for even rows, for example, {G(1, 2), B(2, 2), G(3, 2), B(4, 2), G(5, 2), B(6, 2), G(7, 2), B(8, 2)}. The R, G and B pixels indicate raw data detected by the image sensor and the red, green and blue values indicate interpolated values calculated according to surrounding data.

The following describes the demosaicing method in detail, performed by a processing unit, together with FIGS. 3 and 4 according to an embodiment of the invention. The processing unit 110 calculates a green (RG) value for each R pixel (step S320) and a green (BG) value for each B pixel (step S330). Steps S320 and S330 are performed to obtain the G plane. In step S320, specifically, for each R pixel, the weighted interpolation or the edge-directed interpolation is selected first and the RG value is calculated using the selected interpolation algorithm. Similarly, in step S330, for each B pixel, the weighted interpolation or the edge-directed interpolation is selected first and the BG value is calculated using the selected interpolation algorithm. The weighted interpolation and the edge-directed interpolation are generally referred to as interpolation algorithms to calculate each green value at a specific position according to the corresponding R or B pixel and its surrounding pixel values.

Details for calculating a green (RG/BG) value for an R/B pixel are described below. First, a horizontal coefficient and a vertical coefficient of the R/B pixel are calculated. The horizontal coefficient $V_H(i, j)$ for the R/B pixel at the same position may be calculated using the Equation:

$$V_H(i, j)=(G(i, j-1)+G(i, j+1))/2+(2*V(i, j)-V(i, j-2)-V(i, j+2))/4 \quad (1)$$

where $V(i, j)$ indicates the R/B pixel, $G(i, j-1)$ and $G(i, j+1)$ respectively indicate the prior and the subsequent G pixels along the horizontal direction (x-axis), and $V(i, j-2)$ and $V(i, j+2)$ indicate the prior and the subsequent R/B pixels along the horizontal direction (x-axis). Refer to FIG. 4. In one example, assume that $V(i, j)$ indicates R(3, 3): $G(i, j-1)$ and $G(i, j+1)$ indicate G(3, 2) and G(3, 4), respectively, and $V(i, j-2)$ and $V(i, j+2)$ indicate R(3, 1) and R(3, 5), respectively. In another example, assume that $V(i, j)$ indicates B(4, 4): $G(i, j-1)$ and $G(i, j+1)$ indicate G(4, 3) and G(4, 5), respectively, and $V(i, j-2)$ and $V(i, j+2)$ indicate B(4, 2) and B(4, 6), respectively. The vertical coefficient $V_V(i, j)$ for the R/B pixel at the same position may be calculated using the Equation:

$$V_V(i, j)=(G(i-1, j)+G(i+1, j))/2+(2*V(i, j)-V(i-2, j)-V(i+2, j))/4 \quad (2)$$

where $V(i, j)$ indicates the R/B pixel, $G(i-1, j)$ and $G(i+1, j)$ respectively indicate the prior and the subsequent G pixels along the vertical direction (y-axis), and $V(i-2, j)$ and $V(i+2, j)$ respectively indicate the prior and the subsequent R/B pixels along the vertical direction (y-axis). Refer to FIG. 4. In one example, assume that $V(i, j)$ indicates R(3, 3): $G(i-1, j)$ and $G(i+1, j)$ indicate G(2, 3) and G(4, 3), respectively, and $V(i-2, j)$ and $V(i+2, j)$ indicate R(1,3) and R(5, 3), respectively. In another example, assume that $V(i, j)$ indicates B(4, 4): $G(i-1, j)$ and $G(i+1, j)$ indicate G(3, 4) and G(5, 4), respectively, and $V(i-2,j)$ and $V(i+2, j)$ indicate B(2, 4) and B(6, 4), respectively.

The processing unit 110 calculates a horizontal chrominance difference according to each R or B pixel and its horizontal coefficient. The horizontal chrominance difference may be calculated using the Equation:

$$C_H(i,j)=V(i, j)-V_H(i, j) \quad (3)$$

where $V(i, j)$ indicates an R or B pixel and $V_H(i, j)$ indicates the horizontal coefficient of the R or B pixel. In addition, the processing unit 110 calculates a vertical chrominance difference according to each R or B pixel and the vertical coefficient. The vertical chrominance difference may be calculated using the Equation:

$$C_V(i, j)=V(i, j)-V_V(i, j) \quad (4)$$

where $V(i, j)$ indicates an R or B pixel and $V_V(i, j)$ indicates the vertical coefficient of the R or B pixel.

For each R or B pixel, the processing unit 110 subsequently calculates a horizontal gradient according to the horizontal chrominance difference of the R or B pixel and the horizontal chrominance difference of the first horizontal neighboring-pixel (that is, the next R or B pixel, the same channel, along the x-axis). The horizontal gradient for each R or B pixel may be calculated using the Equation:

$$D_H(i, j)=|C_H(i, j)-C_H(i, j+2)| \quad (5)$$

where $C_H(i, j)$ indicates the horizontal chrominance difference of the R or B pixel and $C_H(i, j+2)$ indicates the horizontal chrominance difference of the first horizontal neighboring-pixel. In addition, the processing unit 110 calculates a vertical gradient according to the vertical chrominance difference of the R or B pixel and the vertical chrominance difference of the first vertical neighboring-pixel (that is, the next R or B pixel, the same channel, along the y-axis).

The vertical gradient for each R or B pixel may be calculated using the Equation:

$$D_V(i, j)=|C_V(i, j)-C_V(i+2, j)| \quad (6)$$

where $C_V(i, j)$ indicates the vertical chrominance difference of the R or B pixel and $C_V(i, j+2)$ indicates the vertical chrominance difference of the first vertical neighboring-pixel.

The processing unit 110 subsequently calculates a delta of the horizontal gradient of each R or B pixel according to the horizontal gradients of the R or B pixel and multiple horizontal neighboring-pixels. The delta of the horizontal gradient for each R or B pixel may be calculated using the Equation:

$$\text{Delta}_H(i, j)=D_H(i-2, j-2)+D_H(i-2, j)+D_H(i-1, j-1)+ \\ \text{weight}*D_H(i, j-2)+\text{weight}*D_H(i, j)+D_H(i+1, \\ j-1)+D_H(i+2, j-2)+D_H(i+2, j) \quad (7)$$

where $\text{Delta}_H(i, j)$ indicates the delta of the horizontal gradient for an R or B pixel, $D_H(i, j)$ indicates the horizontal gradient of the R or B pixel, $D_H(i-2, j-2)$, $D_H(i-2, j)$, $D_H(i-1, j-1)$, $D_H(i, j-2)$, $D_H(i+1, j-1)$, $D_H(i+2, j-2)$ and $D_H(i+2, j)$ indicate horizontal gradients of the horizontal neighboring-pixels including $V(i-2, j-2)$, $V(i-2, j)$, $U(i-1, j-1)$, $V(i, j-2)$, $U(i+1, j-1)$, $V(i+2, j-2)$ and $V(i+2, j)$, respectively, (the calculation may refer to the Equations (1), (3) and (5)) and weight indicates a weighting value. For example, the delta of the horizontal gradient $\text{Delta}_H(3, 3)$ of the R pixel R(3,3) is the weighted sum of $D_H(1, 1)$, $D_H(1, 3)$, $D_H(2,2)$, $D_H(3, 1)$, $D_H(3, 3)$, $D_H(4,2)$, $D_H(5, 1)$ and $D_H(5, 3)$, that is, the weighted sum of the horizontal gradients of R(1, 1), R(1, 3), B(2, 2), R(3, 1), R(3, 3), B(4, 2), R(5, 1) and R(5, 3). The processing unit 110 calculates the delta of the vertical gradient of each R or B pixel according to the vertical gradients of the R or B pixel and multiple vertical neighboring-pixels. The delta of the vertical gradient for each R or B pixel may be calculated using the Equation:

$$\text{Delta}_V(i,j)=D_V(i-2, j-2)+\text{weight}*DV(i-2, j)+D_V(i-2, \\ j+2)+D_V(i-1, j-1)+\text{weight}*D_V(i, j)+D_V(i-1, \\ j+1)+D_V(i, j-2)+D_V(i, j+2) \quad (8)$$

where $\text{Delta}_V(i, j)$ indicates the delta of the vertical gradient for an R or B pixel, $D_V(i, j)$ indicates the vertical gradient of the R or B pixel, $D_V(i-2, j-2)$, $D_V(i-2, j)$, $D_V(i-2, j+2)$, $D_V(i-1,j-1)$, $D_V(i-1, j+1)$, $D_V(i, j-2)$ and $D_V(i, j+2)$ indicate vertical gradients of vertical neighboring-pixels including $V(i-2, j-2)$, $V(i-2, j)$, $V(i-2, j+2)$, $U(i-1, j-1)$, $U(i-1, j+1)$, $V(i, j-2)$ and $V(i, j+2)$, respectively, (the calculation may refer to the Equations (2), (4) and (6)) and weight indicates a weighting value. For example, the delta of the vertical gradient $\text{Delta}_V(3, 3)$ of the R pixel R(3,3) is the weighted sum of $D_V(1, 1)$, $D_V(1, 3)$, $D_V(1, 5)$, $D_V(2, 2)$, $D_V(3, 3)$, $D_V(2, 4)$, $D_V(3, 1)$ and $D_V(3, 5)$, that is, the weighted sum of the vertical gradients of R (1, 1), R(1, 3), R(1, 5), B(2, 2), R(3, 3), B(2, 4), R(3, 1) and R(3, 5).

Next, for each R or B pixel, the processing unit 110 selects one of the weighting interpolation and the edge-directed interpolation according to the delta of the horizontal gradient and the delta of the vertical gradient. For example, the edge-directed interpolation is used to calculate a RG or BG value for the pixel when the absolute of the difference between the deltas of the horizontal and vertical gradients is greater than a first threshold (e.g. 220), the delta of the horizontal gradient of itself is less than or equal to a second threshold (e.g. 20), or the delta of the vertical gradient of itself is less than or equal to the second threshold. When the above three conditions are not met, the weighted interpolation is used to calculate the RG or BG value. In addition, for each R or B pixel, the processing unit 110 stores information in the volatile memory 150, indicating that the weighted interpolation or the edge-directed interpolation is selected to calculate a RG or BG value of the pixel. It should be noted that embodiments of the invention determine whether each R or B pixel belongs to an edge (or a direction) or not according to the deltas of the horizontal and vertical gradients. The chrominance-difference gradient of a direction vertical to an edge is greater than the chrominance-difference gradient along the edge. If the difference between the deltas of the horizontal and vertical gradients for a pixel is great, then the pixel belongs to an edge and the second interpolation algorithm suitable for an edge is employed (i.e. interpolating values along an edge direction, such as, the edge directed interpolation). Otherwise, the first interpolation algorithm suitable for a normal image (such as, the weighted interpolation) is employed. It should be noted that the invention does not intend to limit the first and second interpolation algorithms with the weighted interpolation and the edge-directed interpolation, but include the other interpolation algorithms.

Next, the processing unit 110 calculates an RB value of each R pixel (step S340) and a BR value of each B pixel (step S350). If the second interpolation algorithm (only interpolating values along an edge direction, such as, the edge directed interpolation) is employed in steps S320 and S330, embodiments of the invention further improve the second interpolation algorithm for calculating the RB or BR value of the R or B pixel used in steps S340 and S350. In the situation, details of steps S340 and S350 are described as follows: The processing unit 110 first calculates multiple chrominance differences of surrounding pixels in a first direction and a second direction for each R or B pixel and calculates multiple weighting values of the first direction and the second direction according to the chrominance differences for the first direction and the second direction. Then, the processing unit 110 calculates the RB or BR value for each R or B pixel according to the calculated chrominance differences and weighting values in the first and second directions, and RG and BG values calculated by the aforementioned interpolation algorithm. It should be noted that the first and second directions are orthogonal and an angle between the first direction and the x-axis or between the second direction and the y-axis is about, for example, 45 degrees. In other words, the embodiments of the invention in steps S340 and S350 considers not only the orthogonal directions but also the weighting values of chrominance differences in the x-axis and the y-axis. Exemplary pseudo code used for calculating the RB value for each R pixel or the BR value for each B pixel is as follows:

$$H=|(VG(i-1, j-1)-V(i-1, j-1))-(VG(i+1, j+1)-V(i+1, \\ j+1))|;$$

$$V=|(VG(i-1,j+1)-V(i-1,j+1))-(VG(i+1,j-1)-V(i+1,j-1))|;$$

$$\text{weight1}=1/(1+2*|(VG(i-3,j-3)-V(i-3,j-3))-(VG(i-1,j-1)-V(i-1,j-1))|+H);$$

$$\text{weight2}=1/(1+2*|(VG(i+3,j-3)-V(i+3,j-3))-(VG(i+1,j-1)-V(i+1,j-1))|+V);$$

$$\text{weight3}=1/(1+2*|(VG(i-3,j+3)-V(i-3,j+3))-(VG(i-1,j+1)-V(i-1,j+1))|+V);$$

$$\text{weight4}=1/(1+2*|(VG(i+3,j+3)-V(i+3,j+3))-(VG(i+1,j+1)-V(i+1,j+1))|+H);$$

$$a=(VG(i-1,j-1)-V(i-1,j-1))*\text{weight1}+(VG(i+1,j-1)-V(i+1,j-1))*\text{weight2}+(VG(i-1,j+1)-V(i-1,j+1))*\text{weight3}+(VG(i+1,j+1)-V(i+1,j+1))*\text{weight4};$$

$$b=\text{weight1}+\text{weight2}+\text{weight3}+\text{weight4};$$

$$UV(i,j)=UG(i,j)-a/b;$$

When U(i, j) is a B pixel, V(i−1, j−1), V(i+1, j+1), V(i−1, j+1), V(i+1, j−1), V(i−3, j−3), V(i+3, j−3), V(i−3, j+3) and V(i+3, j+3) indicate R pixels surrounding the B pixel, VG(i−1, j−1), VG(i+1, j+1), VG(i−1, j+1), VG(i+1, j−1), VG(i−3, j−3), VG(i+3, j−3), VG(i−3, j+3) and VG(i+3, j+3) indicate RG values of the surrounding R pixels calculated by the aforementioned interpolation algorithm, UG(i, j) indicates BG value of the B pixel calculated by the aforementioned interpolation algorithm, UV(i, j) indicates BR value of the B pixel. When U(i, j) is an R pixel, V(i−1, j−1), V(i+1, j+1), V(1−1, j+1), V(i+1,j−1), V(i−3, j−3), V(i+3, j−3), V(i−3, j+3) and V(i+3, j+3) indicate B pixels surrounding the R pixel, VG(i−1, j−1), VG(i+1, j+1), VG(i−1, j+1), VG(i+1, j−1), VG(i−3, j−3), VG(i+3, j−3), VG(i−3, j+3) and VG(i+3, j+3) indicate BG values of the surrounding B pixels calculated by the aforementioned interpolation algorithm, UG(i, j) indicates RG value of the R pixel calculated by the aforementioned interpolation algorithm, UV(i, j) indicates RB value of the R pixel. Refer back to FIG. 4. For an example, assume that U(i, j) is the B pixel B(4, 4): V(i−1, j−1) is the R pixel R(3, 3) and VG(i−1, j−1) is the RG value RG(3, 3) calculated in step S320. V(i−1, j+1) is the R pixel R(3, 5) and VG(i−1, j+1) is the RG value RG(3, 5) calculated in step S320. V(i+1, j−1) is the R pixel R(5, 3) and VG(i+1, j−1) is the RG value RG(5, 3) calculated in step S320. V(i+1, j+1) is the R pixel R(5, 5) and VG(i+1, j+1) is the RG value RG(5, 5) calculated in step S320. V(i−3, j−3) is the R pixel R(1, 1) and VG(i−3, j−3) is the RG value RG(1, 1) calculated in step S320. V(i−3, j+3) is the R pixel R(1, 7) and VG(i−3, j+3) is the RG value RG(1, 7) calculated in step S320. V(i+3, j−3) is the R pixel R(7, 1) and VG(i+3, j−3) is the RG value RG(7, 1) calculated in step S320. V(i+3, j+3) is the R pixel R(7, 7) and VG(i+3, j+3) is the RG value RG(7, 7) calculated in step S320. UG(i, j) is the BG value BG(4, 4) calculated in step S330 and UV(i, j) is the final BR value BR(4, 4). For another example, assume that U(i, j) is the R pixel R(5, 5): V(i−1, j−1) is the B pixel B(4, 4) and VG(i−1, j−1) is the BG value BG(4, 4) calculated in step S330. V(i−1, j+1) is the B pixel B(4, 6) and VG(i−1, j+1) is the BG value BG(4, 6) calculated in step S330. V(i+1, j−1) is the B pixel B(6, 4) and VG(i+1, j−1) is the BG value BG(6, 4) calculated in step S330. V(i+1, j+1) is the B pixel B(6, 6) and VG(i+1, j+1) is the BG value BG(6, 6) calculated in step S330. V(i−3, j−3) is the B pixel B(2, 2) and VG(i−3, j−3) is the BG value BG(2, 2) calculated in step S330. V(i−3, j+3) is the B pixel B(2, 8) and VG(i−3, j+3) is the BG value BG(2, 8) calculated in step S330. V(i+3, j−3) is the B pixel B(8, 2) and VG(i+3, j−3) is the BG value BG(8, 2) calculated in step S330. V(i+3, j+3) is the B pixel B(8, 8) and VG(i+3, j+3) is the BG value BG(8, 8) calculated in step S330. UG(i, j) is the RG value RG(5, 5) calculated in step S320 and UV(i, j) is the final RB value RB(5, 5).

Next, the processing unit 110 calculates a red (GR) value for each G pixel (step S360) and a blue (GB) value for each G pixel (step S370). In step S360, the processing unit 110 selects one of the weighted interpolation and the edge-directed interpolation to calculate the GR value for each G pixel according to information indicating which interpolation algorithm was selected in steps S320 and S330 for neighboring R and B pixels. Specifically, for a G pixel G(i, j), the processing unit 110 selects the first interpolation algorithm (such as the weighted interpolation) to calculate the GR value of the G pixel when the first interpolation algorithm is selected to calculate the green values of both neighboring pixels U(i, j−1) and V(i−1, j). Otherwise, the processing unit 110 selects the second interpolation algorithm (such as the edge-directed interpolation) to calculate the GR value of the G pixel when the second interpolation algorithm is selected to calculate the green value of one of neighboring pixels U(i, j−1) and V(i−1, j). Refer back to FIG. 4. For example, for the G pixel G(4, 5), the processing unit 110 refers to information stored in the volatile memory 150, indicating the weighted interpolation or the edge-directed interpolation was selected in steps S320 and S330 for the B pixel B(4, 4) and the R pixel R(3, 5), respectively. If the weighted interpolation was selected to calculate green values for both B(4, 4) and R(3, 5) in steps S330 and S320, respectively, then the processing unit 110 selects the weighted interpolation to calculate the GR value of G(4, 5). Otherwise, the edge-directed interpolation is used. Similarly, for the G pixel G(i, j), the processing unit 110 selects the first interpolation algorithm (such as the weighted interpolation) to calculate the GB value of the G pixel when the first interpolation algorithm is selected to calculate the green values of both neighboring pixels U(i, j−1) and V(i−1, j). Otherwise, the processing unit 110 selects the second interpolation algorithm (such as the edge-directed interpolation) to calculate the GB value of the G pixel when the second interpolation algorithm is selected to calculate the green value of one of neighboring pixels U(i, j−1) and V(i−1, j). Refer back to FIG. 4. For example, for the G pixel G(5, 4), the processing unit 110 refers to information stored in the volatile memory 150, indicating the weighted interpolation or the edge-directed interpolation was selected in steps S320 and S330 for the R pixel R(5, 3) and the B pixel R(4, 4), respectively. If the weighted interpolation was selected to calculate green values for both R(5, 3) and B(4, 4) in steps S320 and S330, respectively, then the processing unit 110 selects the weighted interpolation to calculate the GB value of G(5, 4). Otherwise, the edge-directed interpolation is used.

Although the embodiment has been described in FIG. 1 as having specific elements, it should be noted that additional elements may be included to achieve better performance without departing from the spirit of the invention. While the process flows described in FIGS. 2, 3 and 4 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for demosaicing, performed by a processing unit, the method comprising:
acquiring a frame with a Bayer pattern, wherein the Bayer pattern has alternating red (R), green (G) and blue (B) pixels;
calculating a green (RG) value for each R pixel;
calculating a green (BG) value for each B pixel;
calculating a blue (RB) value for each R pixel, wherein the calculating of the RB value for the R pixel is based on the calculated RG value, the calculated BG value, a plurality of weighting values of surrounding pixels in a first direction and a second direction for the R pixel; and
calculating a red (BR) value for each B pixel, wherein the calculating of the BR value for the B pixel is based on the calculated RG value, the calculated BG value, a plurality of weighting values of surrounding pixels in the first direction and the second direction for the B pixel,
wherein the step of calculating an RG or BG value for each R or B pixel further comprises:
selecting one of a first interpolation algorithm and a second interpolation algorithm according to chrominance differences between the R or B pixel and surrounding pixels in a horizontal direction and a vertical direction; and
using the selected interpolation algorithm to calculate the RG or BG value for the R or B pixel.

2. The method of claim 1, wherein the first interpolation algorithm is a weighted interpolation and the second interpolation algorithm is an edge-directed interpolation.

3. The method of claim 1, wherein the step of selecting a first interpolation algorithm or a second interpolation algorithm according to chrominance differences between the R or B pixel and surrounding pixels in a horizontal direction and a vertical direction further comprises:
calculating a horizontal coefficient and a vertical coefficient according to the R or B pixel and the surrounding pixels;
calculating a first horizontal chrominance difference of the R or B pixel according to the R or B pixel and the horizontal coefficient;
calculating a first vertical chrominance difference of the R or B pixel according to the R or B pixel and the vertical coefficient;
calculating a first horizontal gradient of the R or B pixel according to the first horizontal chrominance difference and a second horizontal chrominance difference of a first horizontal neighboring-pixel;
calculating a first vertical gradient of the R or B pixel according to the first vertical chrominance difference and a second vertical chrominance difference of a first vertical neighboring-pixel;
calculating a delta of a horizontal gradient of the R or B pixel according to the first horizontal gradient and a plurality of second horizontal gradients of a plurality of horizontal neighboring-pixels;
calculating a delta of a vertical gradient of the R or B pixel according to the first vertical gradient and a plurality of second vertical gradients of a plurality of vertical neighboring-pixels; and
selecting one of the first and second interpolation algorithms according to the delta of the horizontal gradient and the delta of the vertical gradient.

4. The method of claim 3, wherein the first horizontal coefficient is calculated using an Equation:

$$V_H(i, j)=(G(i, j-1)+G(i, j+1))/2+(2*V(i, j)-V(i, j-2)-V(i, j+2))/4$$

where $V_H(i, j)$ indicates the first horizontal coefficient, $V(i, j)$ indicates the R or B pixel, $G(i, j-1)$ and $G(i, j+1)$ respectively indicate the prior and the subsequent G pixels along the horizontal direction, and $V(i, j-2)$ and $V(i, j+2)$ respectively indicate the prior and the subsequent R/B pixels along the horizontal direction,
and the first vertical coefficient is calculated by an Equation:

$$V_v(i, j)=(G(i-1, j)+G(i+1, j))/2+(2*V(i, j)-V(i-2,j)-V(i+2,j))/4$$

where $V_V(i, j)$ indicates the first vertical coefficient, $V(i, j)$ indicates the R or B pixel, $G(i-1, j)$ and $G(i+1, j)$ respectively indicate the prior and the subsequent G pixels along the vertical direction, and $V(i-2, j)$ and $V(i+2, j)$ respectively indicate the prior and the subsequent R/B pixels along the vertical direction.

5. The method of claim 4, wherein the first horizontal chrominance difference is calculated by an Equation:

$$C_H(i, j)=V(i, j)-V_H(i, j)$$

where $C_H(i, j)$ indicates the first horizontal chrominance difference, $V(i, j)$ indicates the R or B pixel and $V_H(i, j)$ indicates the horizontal coefficient, and the first vertical chrominance difference is calculated by an Equation:

$$C_V(i, j)=V(i, j)-V_V(i, j)$$

where $C_V(i, j)$ indicates the first vertical chrominance difference, $V(i, j)$ indicates the R or B pixel and $V_v(i, j)$ indicates the vertical coefficient.

6. The method of claim 5, wherein the first horizontal gradient is calculated by an Equation:

$$D_H(i, j)=|C_H(i, j)-C_H(i, j+2)|$$

where $D_H(i, j)$ indicates the first horizontal gradient, $C_H(i, j)$ indicates the first horizontal chrominance difference and $C_H(i, j+2)$ indicates the second horizontal chrominance difference of the first horizontal neighboring-pixel, which is the subsequent R or B pixel along the horizontal direction, and the first vertical gradient is calculated by an Equation:

$$D_V(i, j)=|C_V(i, j)-C_V(i+2,j)|$$

where $D_V(i, j)$ indicates the first vertical gradient, $C_V(i, j)$ indicates the first vertical chrominance difference and $C_V(i+2, j)$ indicates the second vertical chrominance difference of the first vertical neighboring-pixel, which is the subsequent R or B pixel along the vertical direction.

7. The method of claim 6, wherein the delta of the horizontal gradient is calculated by an Equation:

$$\text{Delta}_H(i, j)=D_H(i-2, j-2)+D_H(i-2, j)+D_H(i-1, j-1)+\text{weight}*D_H(i, j-2)+\text{weight}*D_H(i, j)+D_H(i+1, j-1)+D_H(i+2, j-2)+D_H(i+2, j)$$

where Delta$_H$(i, j) indicates the delta of the horizontal gradient, D$_H$(i, j) indicates the first horizontal gradient, D$_H$(i−2, j−2), D$_H$(i−2, j), D$_H$(i−1, j−1), D$_H$(i, j−2), D$_H$(i+1, j−1), D$_H$(i+2, j−2) and D$_H$(i+2, j) indicate the second horizontal gradients, and the delta of the vertical gradient is calculated by an Equation:

Delta$_V$(i, j)=D$_V$(i−2, j−2)+weight*D V (i−2, j)+D$_V$(i−2, j+2)+D$_V$(i−1, j−1) +weight*D$_V$(i, j)+D$_V$(i−1, j+1)+D$_V$(i, j−2)+D$_V$(i, j+2)

where Delta$_V$(i, j) indicates the delta of the vertical gradient, D$_V$(i, j) indicates the first vertical gradient, D$_V$(i−2, j−2), D$_V$(i−2, j), D$_V$(i−2, j+2), D$_V$(i−1, j−1), D$_V$(i−1, j+1), D$_V$(i, j−2) and D$_V$(i, j+2) indicate the second vertical gradients, and weight indicates a weighting value.

8. The method of claim 3, wherein the step of selecting one of the first and second interpolation algorithms according to the delta of the horizontal gradient and the delta of the vertical gradient further comprises:
selecting the second interpolation algorithm when the absolute of the difference between the deltas of the horizontal and vertical gradients is greater than a first threshold, the delta of the horizontal gradient is less than or equal to a second threshold, or the delta of the vertical gradient is less than or equal to the second threshold; and
otherwise, selecting the first interpolation algorithm.

9. The method of claim 1, wherein the respective steps of calculating a blue (RB) value and a red (BR) value for each R pixel and each B pixel further comprise:
calculating a plurality of chrominance differences of surrounding pixels in the first direction and the second direction for the R or B pixel;
calculating the plurality of weighting values of the first direction and the second direction according to the chrominance differences for the first direction and the second direction for the R or B pixel; and
calculating the RB or BR value for the R or B pixel according to the plurality of chrominance differences and the plurality of weighting values in the first and second directions for the R or B pixel.

10. The method of claim 9, wherein the first and second directions are orthogonal and an angle between the first direction and the x-axis or between the second direction and the y-axis is a predefined number of degrees.

11. The method of claim 9, wherein the step of calculating a blue (RB) value and a red (BR) value for each R pixel and each B pixel comprises:
using pseudo code as follows:

H=|(VG(i−1, j−1)−V(i−1, j−1))−(VG(i+1, j+1)−V(i+1, j+1))|;

V=|(VG(i−1, j+1)−V(i−1, j+1))−(VG(i+1, j−1)−V(i+1, j−1))|;

weight1=1/(1+2*|(VG(i−3, j−3)−V(i−3, j−3))−(VG(i−1, j−1)−V(i−1, j−1))|+H);

weight2=1/(1+2*|(VG(i+3, j−3)−V(i+3, j−3))−(VG(i+1, j−1)−V(i+1, j−1))|+V);

weight3=1/(1+2*|(VG(i−3, j+3)−V(i−3, j+3))−(VG(i−1, j+1)−V(i'11, j+1))|+V);

weight4=1/(1+2*|(VG(i+3, j+3)−V(i+3, j+3))−(VG(i+1, j+1)−V(i+1, j+1))|+H);

a=(VG(i−1, j−1)−V(i−1, j−1))*weight1+(VG(i+1, j−1)−V(i+1, j−1))*weight2+(VG(i−1, j+1)−V(i−1, j+1))*weight3+(VG(i+1, j+1)−V(i+1, j+1))*weight4;

b=weight1+weight2+weight3+weight4;

UV(i, j)=UG(i, j)−a/b;

where, when U(i, j) is the B pixel, V(i−1, j−1), V(i+1, j+1), V(i−1, j+1), V(i+1, j−1), V(i−3, j−3), V(i+3, j−3), V(i−3, j+3) and V(i+3, j+3) indicate R pixels surrounding the B pixel, VG(i−1, j−1), VG(i+1, j+1), VG(i−1, j+1), VG(i+1, j−1), VG(i−3, j−3), VG(i+3, j−3), VG(i−3, j+3) and VG(i+3, j+3) indicate RG values of the surrounding R pixels calculated by an interpolation algorithm, UG(i, j) indicates BG value of the B pixel calculated by an interpolation algorithm, UV(i, j) indicates BR value of the B pixel, and, when U(i, j) is the R pixel, V(i−1, j−1), V(i+1, j+1), V(i−1, j+1), V(i+1, j−1), V(i−3, j−3), V(i+3, j−3), V(i−3, j+3) and V(i+3, j+3) indicate B pixels surrounding the R pixel, VG(i−1, j−1), VG(i+1, j+1), VG(i−1, j+1), VG(i+1, j−1), VG(i−3, j−3), VG(i+3, j−3), VG(i−3, j+3) and VG(i+3, j+3) indicate BG values of the surrounding B pixels calculated by an interpolation algorithm, UG(i, j) indicates RG value of the R pixel calculated by an interpolation algorithm, and UV(i, j) indicates RB value of the R pixel.

12. The method of claim 1, further comprising:
calculating a red (GR) value for each G pixel;
calculating a blue (GB) value for each G pixel;
wherein the step of calculating a red (GR) value or a blue (GB) value for each G pixel further comprises:
selecting one of the first interpolation algorithm and the second interpolation algorithm to calculate the GR or GB value for each G pixel according to information indicating which interpolation algorithm was selected for each of a neighboring R pixel and a neighboring B pixel; and
calculating the GR value or the GB value for each G pixel using the selected interpolation algorithm.

13. The method of claim 12, wherein the step of selecting one of the first interpolation algorithm and the second interpolation algorithm to calculate the GR or GB value for each G pixel according to information indicating which interpolation algorithm was selected for each of a neighboring R pixel and a neighboring B pixel further comprises:
selecting the first interpolation algorithm when the first interpolation algorithm is used to calculate the RG and BG values for both the neighboring R pixel and the neighboring B pixel;
otherwise, selecting the second interpolation algorithm,
wherein the neighboring R pixel and the neighboring B pixel are respectively adjacent to the left-hand side and the upper side of the G pixel.

14. An apparatus for demosaicing, comprising:
a camera module controller, coupled to a camera module;
a processing unit, coupled to the camera module controller, acquiring a frame with a Bayer pattern, wherein the Bayer pattern has alternating red (R), green (G) and blue (B) pixels; selecting one of a first interpolation algorithm and a second interpolation algorithm according to chrominance differences between the R or B pixel and surrounding pixels in a horizontal direction and a vertical direction, and then, using the selected interpolation algorithm to calculate the green (RG or BG) value for the R or B pixel; calculating a blue (RB)

value for each R pixel, wherein the calculating of the RB value for the R pixel is based on the calculated RG value, the calculated BG value, a plurality of weighting values of surrounding pixels in a first direction and a second direction for the R pixel; and calculating a red (BR) value for each B pixel, wherein the calculating of the BR value for the B pixel is based on the calculated RG value, the calculated BG value, a plurality of weighting values of surrounding pixels in the first direction and the second direction for the B pixel.

15. The apparatus of claim 14, wherein the processing unit calculates a horizontal coefficient and a vertical coefficient according to the R or B pixel and the surrounding pixels; calculates a first horizontal chrominance difference of the R or B pixel according to the R or B pixel and the horizontal coefficient; calculates a first vertical chrominance difference of the R or B pixel according to the R or B pixel and the vertical coefficient; calculates a first horizontal gradient of the R or B pixel according to the first horizontal chrominance difference and a second horizontal chrominance difference of a first horizontal neighboring-pixel; calculates a first vertical gradient of the R or B pixel according to the first vertical chrominance difference and a second vertical chrominance difference of a first vertical neighboring-pixel; calculates a delta of the horizontal gradient of the R or B pixel according to the first horizontal gradient and a plurality of second horizontal gradients of a plurality of horizontal neighboring-pixels; calculates the delta of the vertical gradient of the R or B pixel according to the first vertical gradient and a plurality of second vertical gradients of a plurality of vertical neighboring-pixels; and selects one of the first and second interpolation algorithms according to the delta of the horizontal gradient and the delta of the vertical gradient.

16. The apparatus of claim 15, wherein the processing unit selects the second interpolation algorithm when the absolute of the difference between the deltas of the horizontal and vertical gradients is greater than a first threshold, the delta of the horizontal gradient is less than or equal to a second threshold, or the delta of the vertical gradient is less than or equal to the second threshold; otherwise, selecting the first interpolation algorithm.

17. The apparatus of claim 14, wherein the processing unit calculates a plurality of chrominance differences of surrounding pixels in the first direction and the second direction for the R or B pixel; calculates the plurality of weighting values of the first direction and the second direction according to the chrominance differences for the first direction and the second direction for the R or B pixel; and calculates the RB or BR value for the R or B pixel according to the plurality of chrominance differences and the plurality of weighting values in the first and second directions for the R or B pixel.

18. The apparatus of claim 17, wherein the first and second directions are orthogonal and an angle between the first direction and the x-axis or between the second direction and the y-axis is a predefined number of degrees.

* * * * *